(12) United States Patent
Hatley (10) Patent No.: US 6,654,701 B2
(45) Date of Patent: Nov. 25, 2003

(54) METHOD AND APPARATUS FOR MEASURING PROTOCOL PERFORMANCE IN A DATA COMMUNICATION NETWORK

(75) Inventor: Tom Hatley, San Jose, CA (US)

(73) Assignee: Spirent Communications, San Jose, CA (US)

( * ) Notice: Subject to any disclaimer, the term of this patent is extended or adjusted under 35 U.S.C. 154(b) by 0 days.

(21) Appl. No.: 09/945,236

(22) Filed: Aug. 30, 2001

(65) Prior Publication Data

US 2003/0050762 A1 Mar. 13, 2003

(51) Int. Cl.$^7$ ............................................. G06F 19/00
(52) U.S. Cl. ..................... 702/122; 702/122; 702/123; 702/182; 702/188; 709/102; 709/104; 709/201; 714/39; 714/47; 714/781; 370/395.31; 370/395.32
(58) Field of Search ................................ 702/119, 122, 702/123, 182–189, FOR 103, 104, 134, 135, 139, 170, 171; 709/102, 104, 107, 201, 213, 223–226, 249, 310, 312, FOR 100, 116; 380/277, 278, 280, 281, 44, 45; 370/395.32, 395.31; 714/39, 47, 781

(56) References Cited

U.S. PATENT DOCUMENTS

| 4,588,985 | A | * | 5/1986 | Carter et al. | 340/347 |
|---|---|---|---|---|---|
| 4,853,928 | A | * | 8/1989 | Williams | 371/15 |
| 5,838,919 | A | | 11/1998 | Schwaller et al. | 709/224 |
| 5,881,237 | A | | 3/1999 | Schwaller et al. | 709/224 |
| 5,937,165 | A | | 8/1999 | Schwaller et al. | 709/224 |
| 6,034,958 | A | * | 3/2000 | Wicklund | 370/395 |
| 6,061,725 | A | | 5/2000 | Schwaller et al. | 709/224 |
| 6,397,359 | B1 | | 5/2002 | Chandra et al. | 714/712 |
| 6,408,335 | B1 | | 6/2002 | Schwaller et al. | 709/224 |
| 6,457,142 | B1 | * | 9/2002 | Klemm et al. | 714/38 |
| 2001/0034839 | A1 | * | 10/2001 | Karjoth et al. | 713/190 |
| 2002/0062223 | A1 | | 5/2002 | Waugh | |

OTHER PUBLICATIONS

Robert Kruse/C.L. Tondo/Bruce Leung, Data Structures & Program Design in C Second Ediiton, Chapter 8.6 –8.7.
Donald Ervin Knuth, The Art of Computer Programming vol. 3: Sorting and Searching, ISBN #0201896850.
William Wesley Peterson, E.J. Weldon, Error–Correcting Codes–Revised, 2nd Edition.

* cited by examiner

Primary Examiner—Marc S. Hoff
Assistant Examiner—Elias Desta
(74) Attorney, Agent, or Firm—The Hecker Law Group (57) ABSTRACT

An embodiment of the invention provides a mechanism for measuring the performance characteristics of data sent across any communication path configured to carry data between two or more computational devices (e.g., local area networks, wide area network, virtual private networks, wireless networks, or any other type of interconnect mechanism). In a test environment, processing speed is a critical part of producing test equipment that can process network protocol data in real-time. Embodiments of the invention provide network test equipment with a methodology for performing enough lookup processing operations to keep up with the real time frame rates of a gigabit Ethernet network. This is accomplished in accordance with one embodiment of the invention by improving the performance of the connection lookup processor in test devices.

37 Claims, 7 Drawing Sheets

METHOD AND APPARATUS FOR MEASURING PROTOCOL PERFORMANCE IN A DATA COMMUNICATION NETWORK

FIELD OF THE INVENTION

This invention relates to the field of computer technology. More specifically, the invention relates to a method and apparatus for measuring protocol performance in a data communication network.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyrights whatsoever.

BACKGROUND

In order to transmit data from one computer to another the data may be sent across computer networks. So that each computer connected to the network can send and receive data from other computers on the network, each of the interconnected computers is typically configured to understand one or more common protocols. Each protocol defines a format for encapsulating data and transmitting that data across the network. Protocols designed to send data across packet switched networks (e.g., the Internet) typically divide the data that is to be transmitted into sets of packets. Each packet is then sent through the network to the indicated destination. The path that each packet takes may vary, but in every instance the packet data will be sent through network equipment such as a router, switch, hub, and/or any other type of network node.

The performance of the network is dependent upon how quickly the packet data is transmitted through such network equipment. Modern network equipment is designed to move packet data through the network at rates that exceed the connection speed. If, for example, a router is connected to a Gigabit Ethernet network, that router must be capable of moving data at speeds that do not lead to bottlenecking. If a certain device is not able to operate on the packet data at such rates, the network becomes bottlenecked and the overall data transfer rate associated with the entire network can decrease. Therefore, a constant concern network engineers have is whether, or not, the equipment being connected to the network can adequately handle the data speeds of the network. When the routing hardware is efficient, the network itself is efficient.

To address this concern, network engineers and others responsible for ensuring the network remains efficient use devices that can test the speed of the routers and other such pieces of hardware utilized to control packet flow. Such test devices are generally referred to as network test devices. A problem encountered by such test devices is that to effectively measure the performance of protocol data, the test equipment itself must be able to keep up with the transmission speeds of the routing hardware and the data line. In order to assess the behavior of the network for each of the connections, the test equipment must be able to perform a lookup operation to associate each packet with a particular connection. The test equipment must be able to perform this required connection lookup processing for each packet at any given transmission speed. Current performance testing systems have a limited capacity for performing this connection lookup and for processing protocol data when the network speed exceeds one Gigabit per second.

Thus, there is a need for improving the efficiency of connection lookup operations while placing one or more network devices under test.

SUMMARY OF THE INVENTION

An embodiment of the invention provides a mechanism for measuring the performance characteristics of data sent across any communication path configured to carry data between two or more computational devices (e.g., local area networks, wide area network, virtual private networks, wireless networks, or any other type of interconnect mechanism). In a test environment, processing speed is a critical part of producing test equipment that can process network protocol data in real-time. Embodiments of the invention provide network test equipment with a methodology for performing enough lookup processing operations to keep up with the real time frame rates of a gigabit Ethernet network.

This is accomplished in accordance with one embodiment of the invention by improving the performance of the connection lookup processor in test devices. The lookup processor initiates processing when it obtains connection data (e.g., TCP) from a request FIFO. Once the lookup processor receives an incoming datagram containing connection data (e.g., TCP or any other type of datagram to be evaluated), the processor determines a connection index that corresponds to the connection represented by the datagram. Each connection is uniquely identified by the source and destination information associated with the datagram. For instance, each incoming connection may be uniquely identified by examining the source address, destination address, source port, and destination port associated with the connection. Once the connection data is obtained, that data is utilized to perform a lookup operation. During the lookup operation a hashing operation is performed on the connection data and the connection data is associated with an index or hash vector used to find the table of state information for the connection. In accordance with one embodiment of the invention, the lookup operation is performed using an SDRAM memory configured as a chained hash table, using a polynomial hashing algorithm.

Because the lookup processing is performed in a performance measurement system, the hashing algorithm that is selected must be capable of performing enough lookup processing operations to keep up with the frame rates of a Gigabit per second or above Ethernet network. Therefore, the invention contemplates the use of a polynomial hashing algorithm that seeks to distribute the incoming keys as evenly as possible over the range of possible hash function values. The degree of the polynomial used by the hashing algorithm at step 302 is chosen in one embodiment of the invention to give the desired range of hash vectors. Thus, the depth of the linked lists associated with the chained hash table is minimized and the efficiency associated with lookup processing is increased. When the system embodying the invention is configured to handle at least 2 million connections, the chained hash table has an unallocated size capable of storing 2097152 Keys. A suitable hashing polynomial would be $19^{th}$ degree; this produces 524288 distinct hash vectors.

When polynomial hashing is utilized the key to be hashed (e.g., a 96-bit key) is passed through a polynomial division operation. The remainder from the division operation becomes the value of the hash function utilized for the table lookup. The performance of the hashing algorithm is dependent upon the hashing polynomial that is selected. For instance some polynomials perform better than others. The degree of the polynomial that is selected depends upon how many bits are desired in the hash value itself. For a CRC polynomial of order N, the number of unique hash values possible is $2^N$. In one embodiment of the invention, the polynomial order is approximately ¼ the size of the number of lookups desired. For example, for 2 million connections the maximum size of the lookup table is 2,097,152 ($2^{21}$) therefore the polynomial that would maximize efficiency in one embodiment of the invention would be a polynomial of size $2^{19}$. For a polynomial to be utilized in a hash function, the polynomial should be primitive. For degree 19, there are at least 11 primitive polynomials. In one embodiment of the invention polynomial 7 is viewed as the most effective polynomial. However, other polynomial hashing algorithms can be incorporated into embodiments of the invention and utilized during lookup processing.

DETAILED DESCRIPTION

A method and apparatus for testing protocol performance in a data communication network is described. In the following description numerous specific details are set forth in order to provide a more thorough understanding of the present invention. It will be apparent, however, to one skilled in the art, that the present invention may be practiced without these specific details. In other instances, well-known features have not been described in detail so as not to obscure the invention.

System Overview

An embodiment of the invention provides a mechanism for measuring and/or testing the performance characteristics of data sent across any communication path configured to carry data between two or more computational devices (e.g., local area networks, wide area network, virtual private networks, wireless networks, or any other type of interconnect mechanism). In a test environment, processing speed is a critical part of producing test equipment that can process network protocol data in real-time. Embodiments of the invention provide network test equipment with a methodology for performing enough lookup processing operations to keep up with the real time frame rates of a gigabit Ethernet network. However, the invention also has applicability in other network environments and is not limited solely to gigabit Ethernet networks.

In one embodiment the mechanism for measuring performance characteristics data is configured to test the performance of data sent using one or more standard protocols. For instance, the system may determine the performance of data associated with a protocol connection such as a TCP connection. TCP is utilized herein as an example of the type of data embodiments of the invention may operate on. However, the methodologies described herein are also applicable to other types of network communication protocols. The reader should also note that embodiments of the invention may be implemented in hardware and/or software form. For instance, the invention may be incorporated into a computer program product or be embedded into one or more portions of a hardware apparatus.

When protocol data is transmitted across a network, the protocol data is routed through one or more intermediate nodes. For example, data sent from one network to another may be transmitted through multiple routers, switches, hubs, and other sorts of network nodes or computational devices. Embodiments of the invention provide a mechanism for analyzing the performance of devices utilized to move protocol data through the network. For instance, referring now to FIG. 1, a test device configured to determine the performance of one or more network devices is shown. Test device 100 may be inserted into network 102 to determine how well one or more network devices (e.g. 104, 103, or 106) function. Test device 100 comprises protocol engine 101. In one embodiment of the invention protocol engine 101 is configured to efficiently establish a large number of connections through the device under test (e.g., network device 104). Protocol engine 101 may establish connections back to more test devices (e.g., 108) or back to the device under test. Test device 100 may, for example, optionally link back to network device 104 or link to network device 106. In some instances test device 100 is coupled directly to additional test equipment (e.g., test device 108) and configured to measure additional performance characteristics generally associated with network 102.

Figure 1:
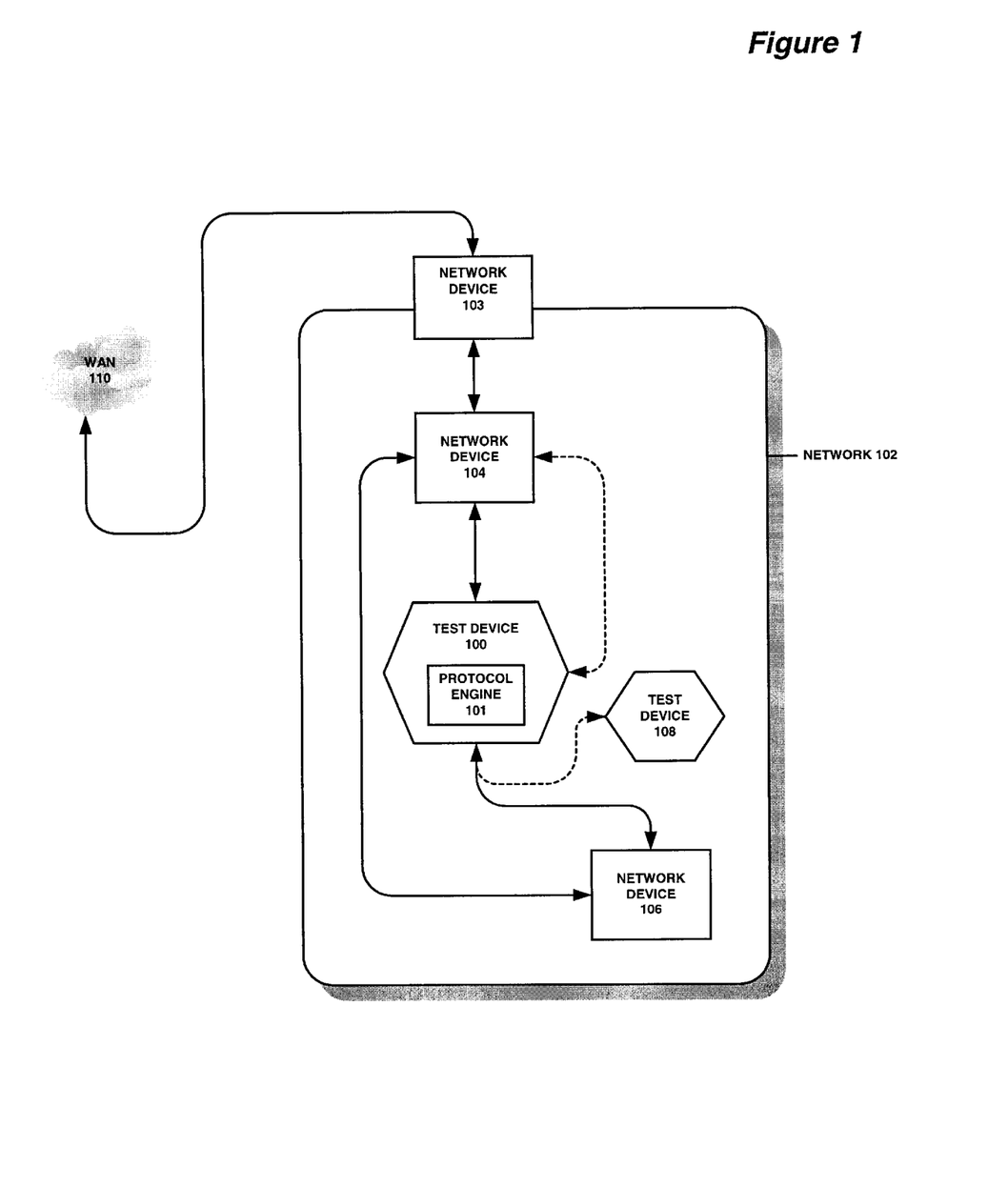
FIG. 1 illustrates the positioning of a test device configured to determine the performance of one or more network devices in accordance with one embodiment of the invention.

When network 102 is a high-speed network (e.g., 1 gigabit+Ethernet), protocol engine 101 (which may processes TCP and other types of data) in test device 100 can efficiently perform a large number (e.g., millions) of connection lookup operations. Thus, embodiments of the invention provide a mechanism for improving the efficiency of connection lookup operations while placing one or more network devices under test. For instance in an embodiment of the invention targeted to Gigabit+Ethernet, a lookup processor, configured in accordance with the invention and having access to SDRAM memory with 8 MDwords, can perform lookup processing of up to 2 Mconnections, at full line rate of 1.488 Mconnections per second. For example, when the minimum Ethernet frame has a size of 64 bytes, plus an 8-byte preamble (72 bytes total), the time required to transmit this frame at the link clock rate, plus the minimum inter-frame gap, typically determines the minimum interval between successive worst case frames. If, for example, the link transfers data across the link at a byte rate of 125 MHz, and has a minimum inter-frame gap of 96 nanoseconds. The time for transmitting is typically $72/(125 \times 10^6) = 576 \times 10^{-9} = 576$ nanoseconds. The minimum interval between worst case frames is then 576+96=672 nanoseconds. Thus, in a worst case scenario the lookup processor embodying the invention can perform a connection index lookup within 672 nanoseconds. The reader should note that the exact number of connections, the system may process, can increase or decrease depending upon the environmental characteristics in which the lookup processor is operating within. Thus, the invention may function quicker or slower than the example provided herein. The invention may be implemented in other types of networks that have other characteristics and therefore perform lookup processing operations at varying speeds.

Figure 2A:
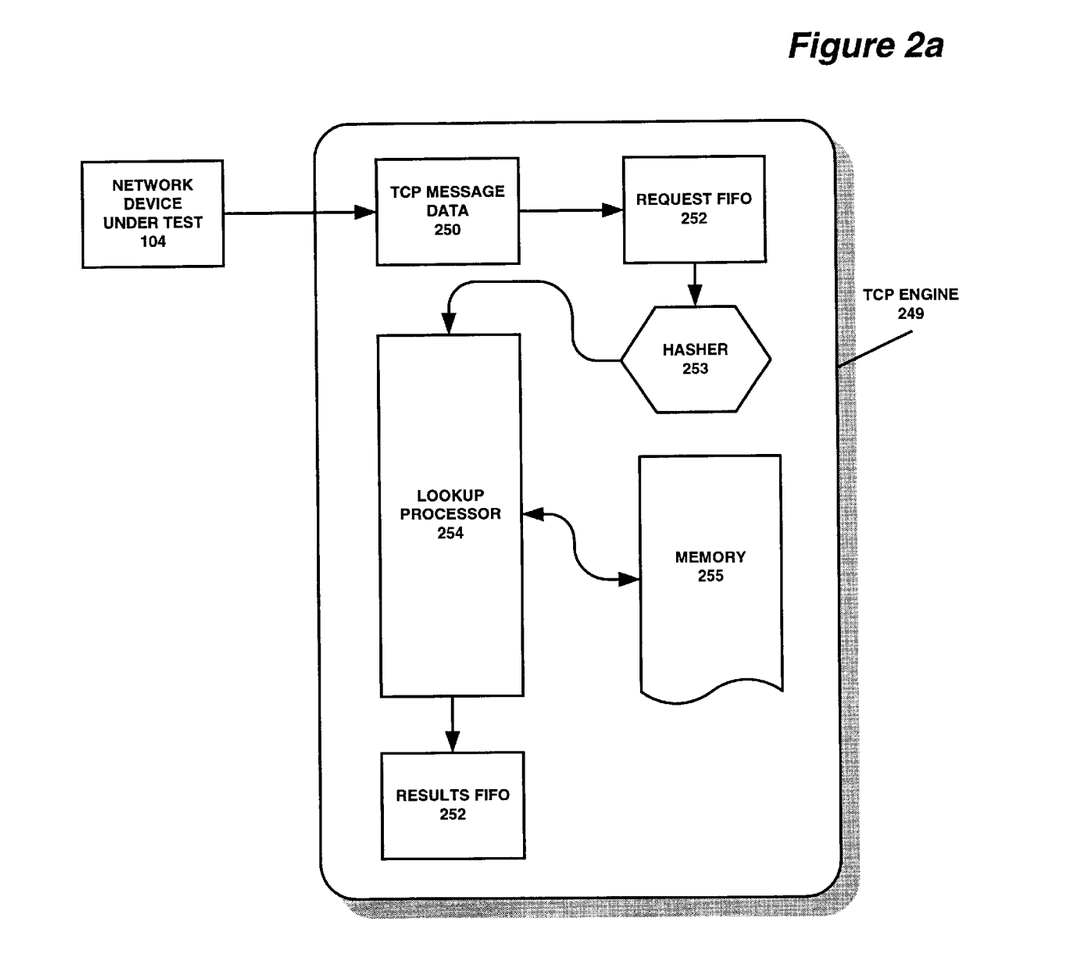
FIG. 2a comprises a high-level block diagram illustrating the components of the protocol engine utilized in accordance with one embodiment of the invention to evaluate message data.

FIG. 2a comprises a high-level block diagram illustrating the components of the Protocol engine (e.g., TCP engine) utilized in accordance with one embodiment of the invention to evaluate TCP message data. Protocol engine 249 obtains protocol message data from one or more network devices under test (e.g., 104) and passes the protocol message data 250 to request FIFO 252. Request FIFO 252 then queues the message data for processing by hasher 253. Hasher 253 operates on message data 250 to efficiently prepare the data for processing by lookup processor 254. The specific operations performed by hasher 253 are described in further detail below. Hasher 253 and lookup processor 254 utilize data held in memory 255 during connection lookup processing. For example, the hasher receives the lookup key and produces the hash value from it, and the lookup processor uses the hash value for accessing the memory. Once processing is complete the results are output to results FIFO 256. Hasher 253 enables lookup processor 254 to evaluate the protocol message data 250 in an efficient manner that improves upon the prior art techniques for testing protocol performance.

Connection Lookup Processing

Figure 2B:
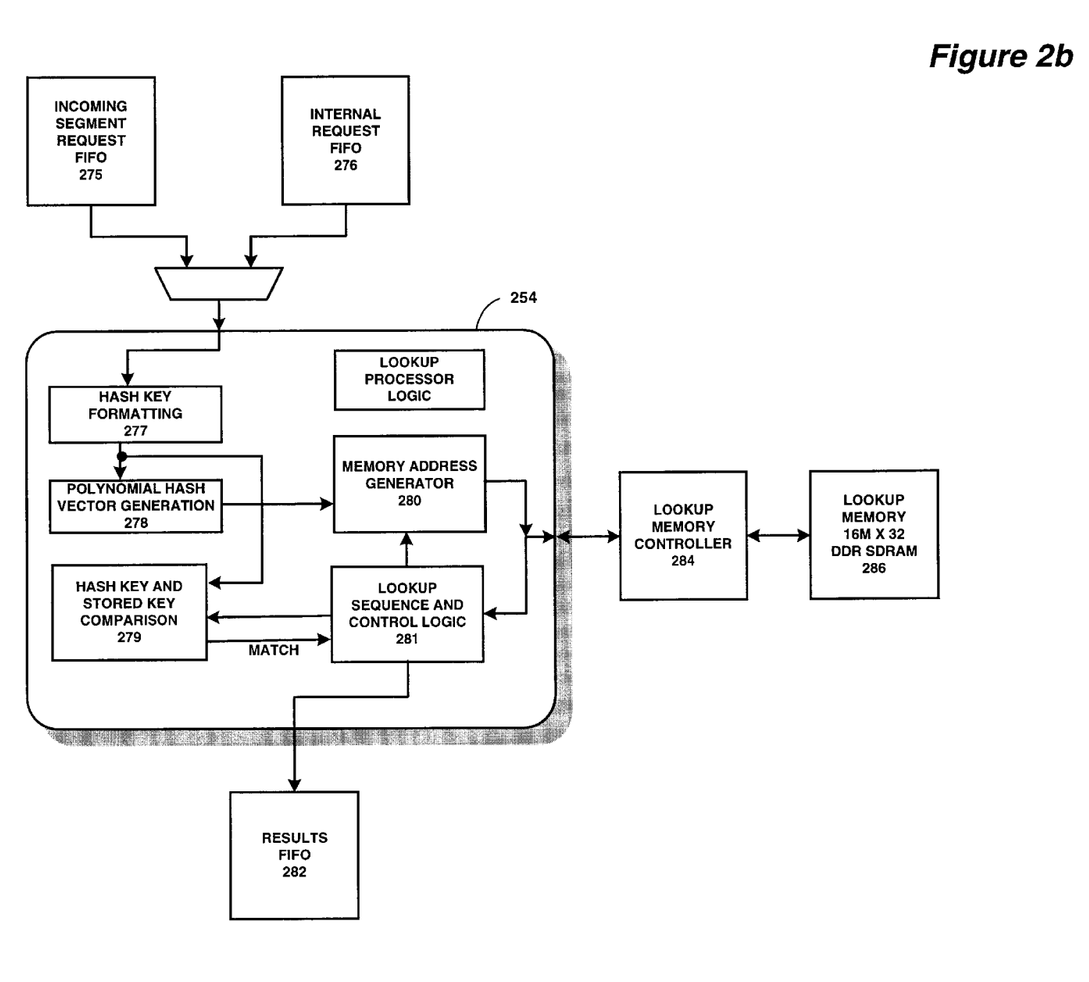
FIG. 2b illustrates the components of lookup processor 254 in accordance with one embodiment of the invention.

FIG. 2b illustrates the processor logic of lookup processor 254 in accordance with one embodiment of the invention. Lookup processor 254 may contain various components that aid in the generation of a connection index. For instance, in one embodiment of the invention lookup processor 254 comprises a hash key-formatting module 277 configured to handle initial formatting and processing of the hash key in accordance with the technique describe in further detail below. For instance, hash-key formatting module 277 may obtain protocol connection data from FIFOs 276 and 275 and provide that data to polynomial hash vector generation module 278 which generates a hash vector using the connection data. Hash key and stored key comparison module 279 is configured to handle any hash vector collisions that occur.

Upon generation of a hash vector, memory address generator 280 obtains a memory address for examination of stored keys associated with the hash vector within the lookup memory 286. If the content of the hash vector memory location is zero, then this hash vector has not previously been seen. In that case, the formatted hash key is written into a free stored key area within the memory, and the hash vector that contained zero is written with the address of that stored key area. If the content of the hash vector memory location is non-zero, then this hash vector has been previously seen, and the hash vector points to a linked list of stored keys associated with that hash vector. The lookup sequence and control logic 281 along with the hash key and stored key comparison 279 function to search the linked list for an entry whose stored key matches the incoming hash key. When processing is complete, the result (a value encoded from the memory address of the matching or newly added stored key) is passed to the results FIFO 282.

Figure 3:
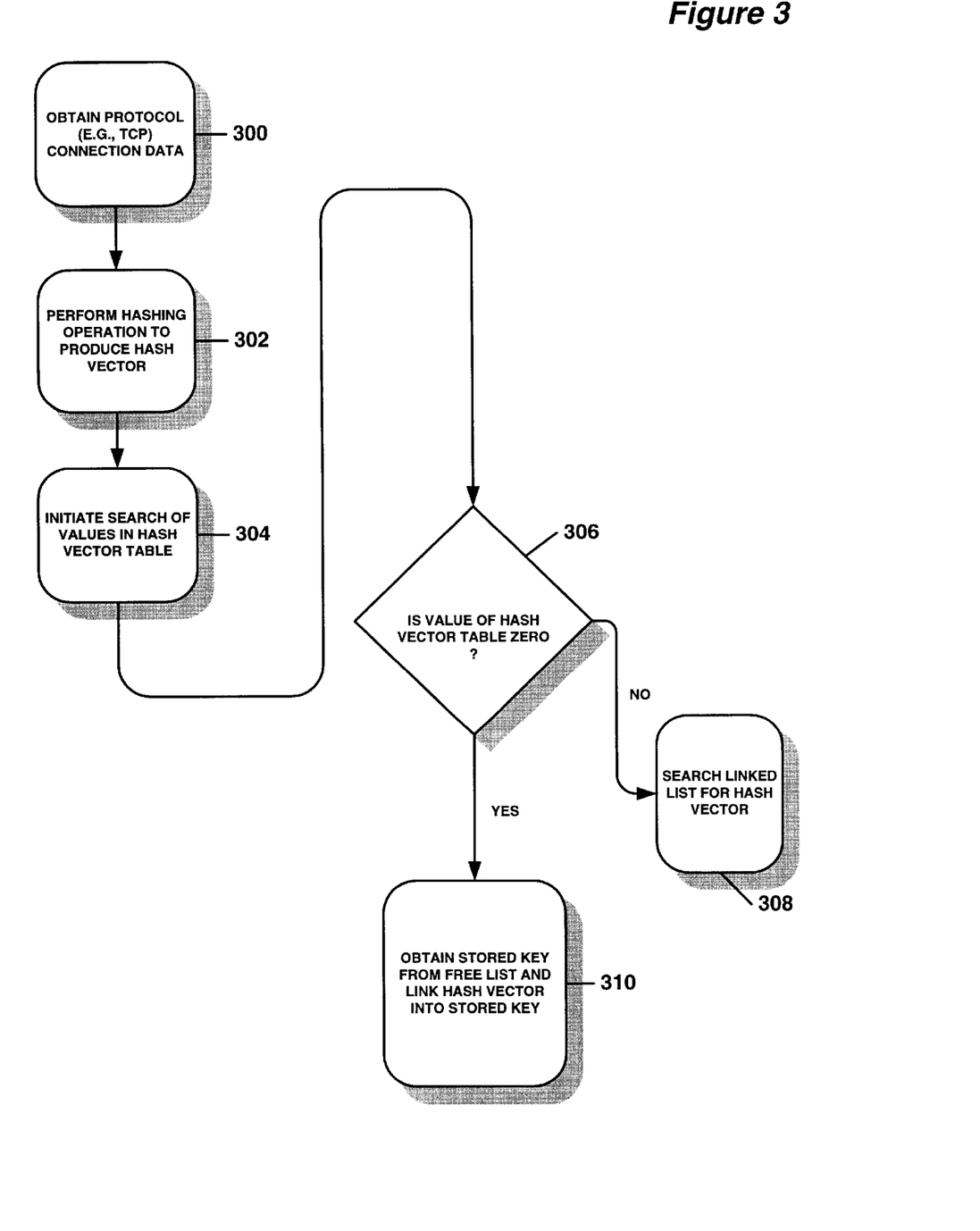
FIG. 3 illustrates the specific operational characteristics of lookup processor in accordance with one embodiment of the invention.

FIG. 3 illustrates the specific operational characteristics of lookup processor 254 in accordance with one embodiment of the invention. Lookup processor 254 initiates processing when it obtains protocol connection data from the request FIFO (e.g., at step 300). When lookup processor 254 receives an incoming datagram (e.g., TCP or any other type of datagram to be evaluated), the processor determines a connection index that corresponds to the connection represented by the datagram. Each connection is uniquely identified by the source and destination information associated with the datagram. For instance, each incoming connection may be uniquely identified by examining the source address, destination address, source port, and destination port associated with the connection. For instance, the following information uniquely identifies a TCP connection:

| | |
|---|---|
| Source IP Address | 32 bits for IPv4 128 for IP6 |
| Source Port | 16 bits |
| Destination IP Address | 32 bits for IPv4 128 bits for IP6 |
| Destination Port | 16 bits |

Data utilized for such purposes may vary in size depending upon the protocol that data conforms with and the system incorporating aspects of the invention is designed so that it may be adapted for use with future and past data communication protocols.

Once the connection data is obtained, that data is utilized to perform a lookup operation. During the lookup operation a hashing operation is performed on the connection data (e.g., at step 302) and the connection data is associated with an index or hash vector used to find the table (e.g., step 304) of state information for the connection.

Perform Polynomial Hashing

In accordance with one embodiment of the invention, the lookup operation is performed using an SDRAM memory configured as a chained hash table, using a polynomial hashing algorithm. The invention is not limited solely to polynomial hashing algorithms, however polynomial hashing is used in accordance with one embodiment of the invention as it provides a hardware-efficient and extensible means for generating a hash vector from an arbitrary input key. The invention also contemplates the use of other forms of memory in addition to SDRAM and is not limited to the use of such memory.

Once the connection data is obtained at step 300, that data (which comprises the connection's source address, destination address, a source port, and address port) is used as a hash key. This technique may be utilized to process varying types of protocol connection data. For instance, the size of the connection data varies depending upon whether the connection data conforms to the Internet Protocol Version 6 (IPV6) or Internet Protocol Version 4 (IPV4) standard. In the case of IPV4, the hash key comprises the source and destination IP addresses and ports. When the system is configured to process IPV6 data, the hash key is larger than it is with IPV4 data because the address data is 128 bits instead of 32. However, the reader should note that embodiments of the invention may operate on connection data of any size or type. Thus, changes in the bit size or protocol definition do not necessarily modify the mechanism for processing data described herein.

Table A shown below illustrates how the addresses and ports may be organized into a set of DWORDs to be used as a hash key. For example, a set of three 32-bit words is appropriate for IPv4. For IPv6, the hash key will be longer, because the addresses are longer. Note that terms "Near" and "Far" addresses may be utilized instead of source and destination address. This allows the same indexing to be used for the Transmitter logic as well as the Receive logic. However, the invention may also utilize source and destination addresses.

TABLE A

Near IP Address
Far IP Address
Near Port #    Far Port #

The connection data which represents a hash key is then processed by an appropriate hashing algorithm and associated with a hash vector (e.g., at step 302). In one embodiment of the invention, the hash key is passed through a polynomial hashing operation where the quotient is initialized to all 1's. The output of this operation is referred to in accordance with one embodiment of the invention as a hash vector or index. Thus, an embodiment of the invention utilizes a hash function h(k) that takes a 96-bit key K (composed of 2 IP addresses & port information) and produces an N-bit hash value used to start a table search (e.g., at step 304).

Figure 4:
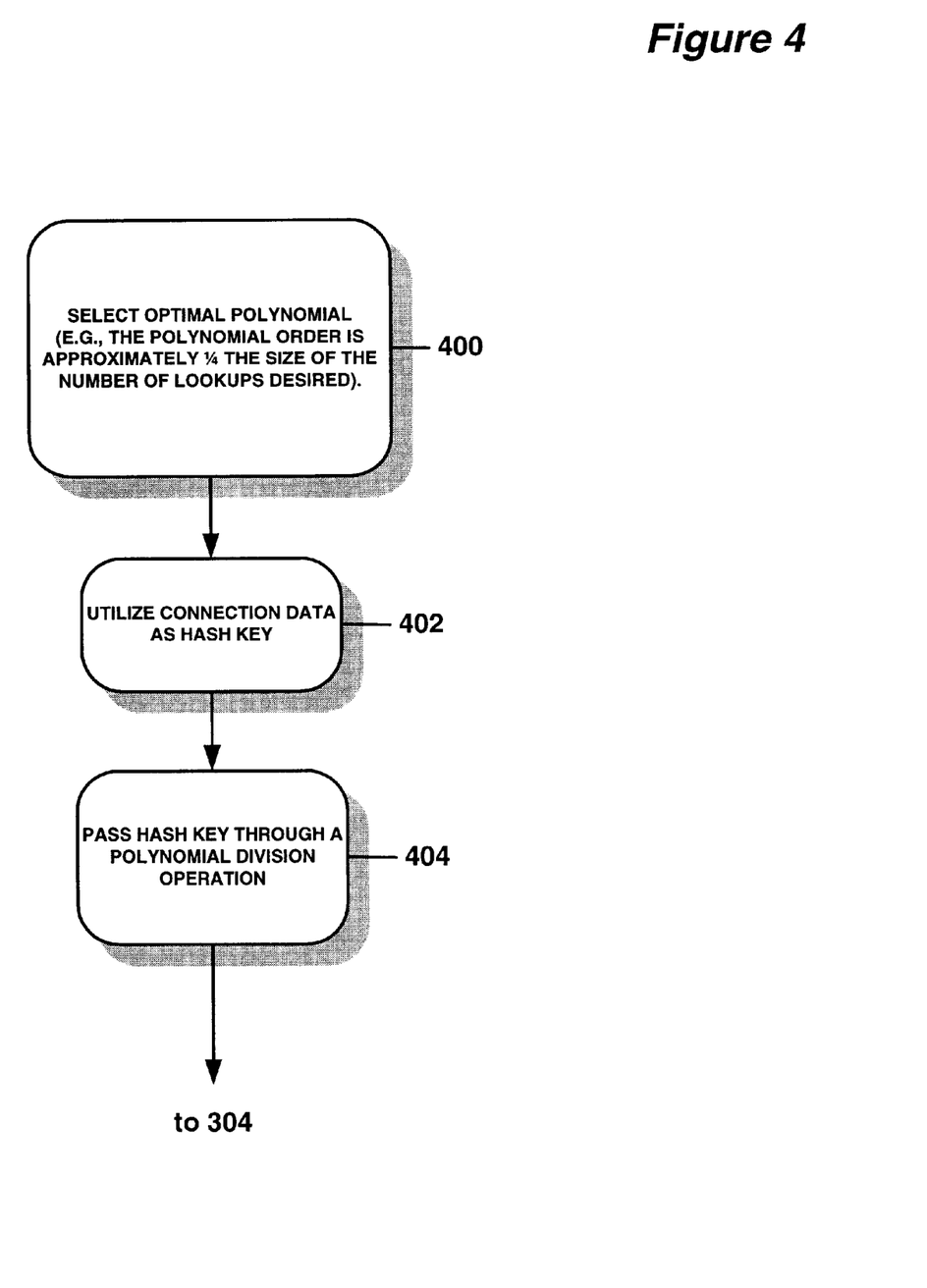
FIG. 4 illustrates a more detailed view of the process for optimized hashing in accordance with one embodiment of the invention.

Because the lookup processing is performed in a performance measurement system, the hashing algorithm that is selected must be capable of performing enough lookup processing operations to keep up with the frame rates of a Gigabit+Ethernet network. Therefore, the invention contemplates the use of a hashing algorithm that distributes all incoming keys as evenly as possible over the range of possible hash function values. FIG. 4 illustrates a more detailed view of the process for optimized hashing (e.g., step 302) in accordance with one embodiment of the invention. The degree of the polynomial used by the hashing algorithm at step 302 is chosen in one embodiment of the invention to give the desired range of hash vectors. Thus, the depth of the linked lists associated with the chained hash table is minimized and the efficiency associated with lookup processing is increased.

The performance of the hashing algorithm at step 302 is dependent upon the hashing polynomial that is selected. For instance some polynomials perform better than others. Embodiments of the invention utilize various polynomials and the invention is not limited to a particular polynomial hashing algorithm. The degree of the polynomial that is selected depends upon how many bits are desired in the hash value itself. For a CRC polynomial of order N, the number of unique hash values possible is $2^N$. In one embodiment of the invention, the polynomial order is approximately ¼ the size of the number of lookups desired (see e.g., step 400). For example, for 2 million connections the maximum size of the lookup table is 2,097,152 ($2^{21}$) therefore the polynomial that would maximize efficiency in one embodiment of the invention would be a polynomial of size $2^{19}$. The reader should note that although one specific mechanism for selecting polynomials is described, that the invention contemplates the use of polynomials of varying order.

For a polynomial to be utilized in a hash function, the polynomial should be primitive. For degree 19, there are at least 11 primitive polynomials. The polynomials themselves are listed below in octal representation:

| | |
|---|---|
| Polynomial 1 | 2000047 |
| Polynomial 2 | 2020471 |
| Polynomial 3 | 2013211 |
| Polynomial 4 | 2570103 |
| Polynomial 5 | 2561427 |
| Polynomial 6 | 2227023 |
| Polynomial 7 | 2001711 |
| Polynomial 8 | 2331067 |

-continued

| | |
|---|---|
| Polynomial 9 | 3146455 |
| Polynomial 10 | 3610353 |
| Polynomial 11 | 2766447 |

In one embodiment of the invention polynomial 7 is viewed as the most effective polynomial. Thus, referring now to FIG. 4, step 400 polynomial 7 might be selected. However, other polynomial hashing algorithms can be incorporated into embodiments of the invention and utilized during lookup processing. For example, the invention also contemplates polynomials where the polynomial order is approximately ¼ the size of the number of lookups desired. Thus, the polynomial that is considered most effective may vary depending upon the number of lookups desired, and on the distribution of connection addresses anticipated in the testing to be done.

When polynomial hashing is utilized the key to be hashed (e.g., a 96-bit key of connection data) is passed through a polynomial division operation (see e.g., steps 402 and 404). The remainder from the division operation becomes the value of the hash function utilized for the table lookup. Polynomial hashing is not typically used during lookup processing because it is a computationally intensive technique when implemented in software form. Thus, hardware implementations using a polynomial-hashing algorithm may be more efficient. Thus, one embodiment of the invention contemplates the use of a computational mechanism similar to a CRC polynomial (e.g., the standard FCS-16) implemented in hardware using pipeline architectures. In such an embodiment, the chosen hashing polynomial is substituted for the FCS16 polynomial. The pipeline architecture enables the hardware embodiment of the invention to efficiently perform lookup processing in spite of the delay imposed by the polynomial operation. The reader should note, however, that software implementations of the invention are also contemplated.

Initiate Search of Values in Hash Vector Table

Once the connection data is utilized as a hash key (e.g., step 402) and passed through the polynomial hashing operation (e.g., step 404), the system initiates a search of the hash vector table (see e.g., step 304). As is typically the case with hash lookup techniques, a process for dealing with collisions must be established.

A collision occurs when more than one key value produces the same value from the chosen hash function. If for instance, two different sets of connection data processed by the hashing algorithm produce the same hash vector (key value) then a collision is said to have occurred. Embodiments of the invention contemplate the use of multiple techniques for handling collisions. One such technique is referred to as open addressing using linear probing. When this technique is utilized, the systems embodying the invention are configured to evaluate the address indicated by the hash function value and test the constant in that location. If the location is empty, (e.g., the value of the hash vector table is zero, step 306) that location may be utilized for the key (e.g., step 310). If that location is not empty, successive locations are evaluated until an empty location is found (e.g., 308) or until a match occurs, in which case the lookup operation is complete. When an empty location is found the stored key is obtained from a free list and stored in the available location.

Another mechanism for handling collisions is referred to as open addressing using double hashing. In this instance, if the address indicated by the hashing function value is already in use, then a second hashing function is used to determine where to look next. A third process for handling collisions involves "chaining". In this method, the hash function points to a vector of pointers to a list of key having the same hash function value.

Figure 5:
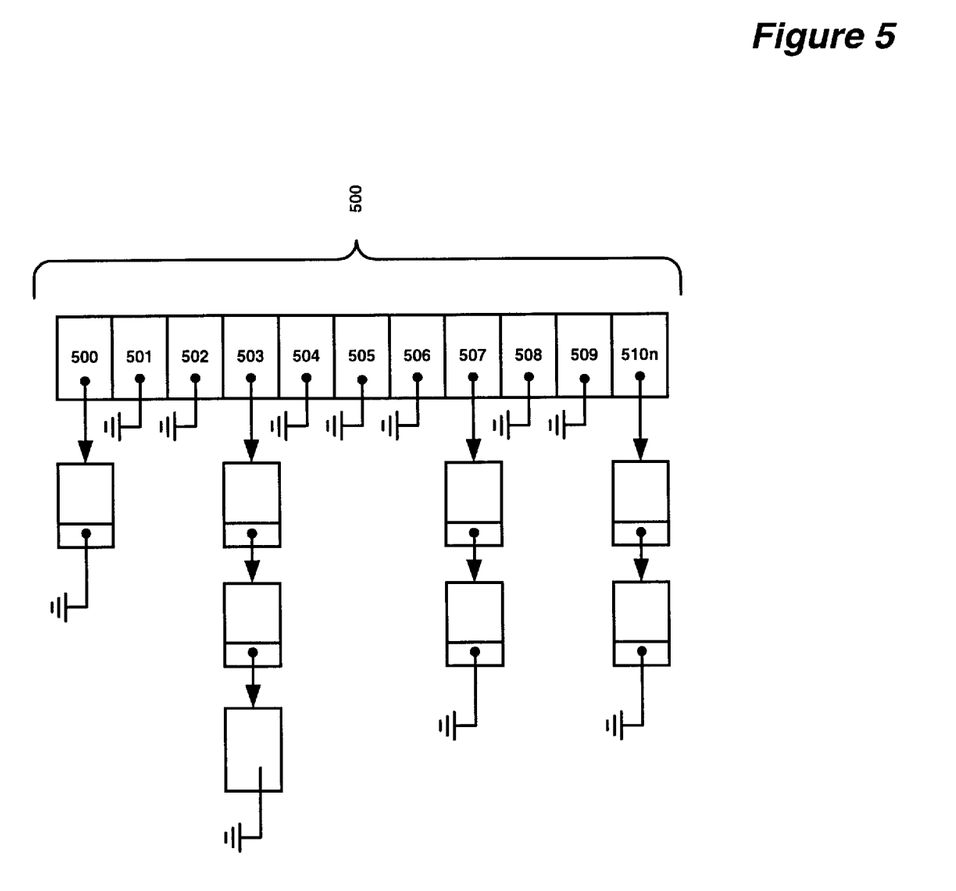
FIG. 5 illustrates a chained hash table utilized in accordance with one embodiment of the invention.

FIG. 5 illustrates a chained hash table for storing keys generated using a polynomial hash algorithm in accordance with one embodiment of the invention. The hash table 500 contains a number of locations 500–510*n* (the size of the hash table is variable). Empty locations 501, 502, 504, 505, 506, 508, and 509 represent locations in the hash table that do not contain keys. Locations 500, 503, 507, and 510, represent hash table locations that contain stored keys. Each location that contains stored keys may hold one or more keys. Location 503, for example, contains three keys and locations 507 and 510*n* contain two keys. Location 500 only contains one key. Embodiments of the invention provide a mechanism for minimizing the number of keys stored in a single location. Specifically, the hashing techniques described herein contains a simple and efficient collision handling that minimizes the number of keys associated with the same address/location in the hash table. The hash table can be configured to store multiple keys (limited by memory size) and methodologies described with respect to step 306, 308, and 310 are utilized to minimize the number of collisions.

Hash Memory Allocation

The following section provides further explanation of the technique utilized in embodiments of the invention to enhance the connection lookup processing speed of a network performance measurement device. Referring back to FIG. 1, the memory (e.g., SDRAM or some other form of memory) of the test device (see e.g., 249), holds the stored keys that are to be looked up via hashing. The format of the stored key held in memory 255 is similar to that of the hash key, but in one embodiment of the invention contains one additional field. Table 2—2 shows the format of the stored key in memory.

TABLE 0-1

| Stored Key Format |
| --- |
| Near IP Address |
| Far IP Address |
| Near Port #                Far Point # |
| Next Key Index |

In one embodiment of the invention, memory 255 is SDRAM and has room for 2097152 stored keys. The memory size is thus 2097152*16=33554432 (32 Mbyte)

The first part of SDRAM memory is allocated to a hash pointer table (see e.g., FIG. 5 block 500). There will be 524288 such entries, initially filled with zero (see e.g. blocks 501, 502,504,505, 506, 508, and 509 and/or FIG. 6, block 603). This takes up enough room for 524288/4=131072 stored keys. The remaining SDRAM memory is filled with 2097152−131072=1966080 stored keys. Thus, this configuration is limited to looking up a maximum of 1966080 TCP Connections. The reader should note that varying the memory type or size may increase or decrease the number of stored keys that can be held in memory.

Figure 6:
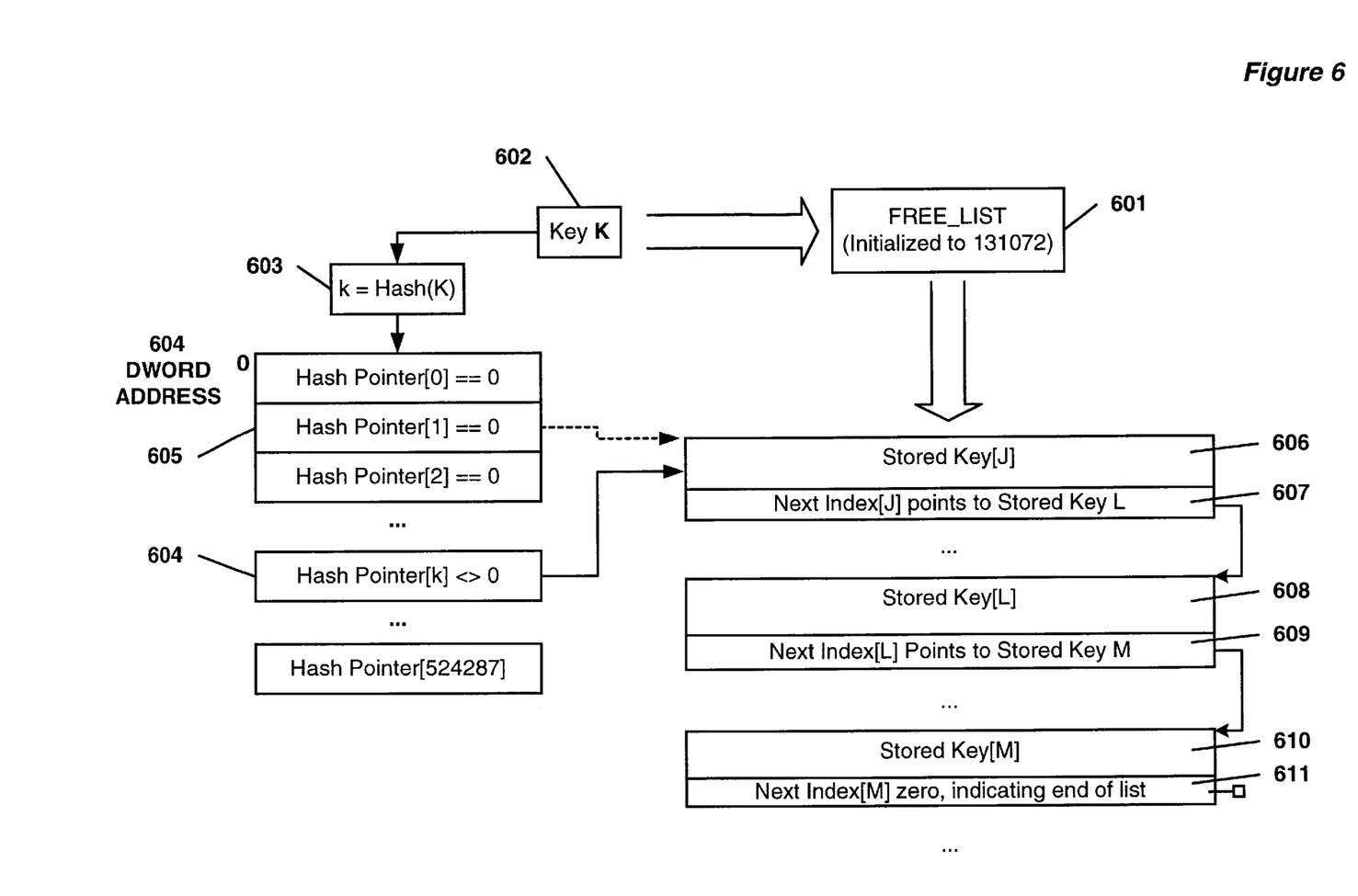
FIG. 6 shows representation of the hash memory structure when it is initialized in accordance with one embodiment of the invention.

Initially, the stored keys may be linked together into a list that may be referred to as the free list (e.g. 630). A pointer to the first element in the free list may be maintained in the FREE_LIST Register (e.g. 610). The FREE_LIST register may be initialized, in one embodiment of the invention, to 0×20000, pointing to the first stored key past the hash pointer table. The first stored key may therefore have its next key index set to 0×200001, etc. The final stored key in the table would have a next key index of zero. FIG. 6 shows a representation of the hash memory when it is initialized in accordance with one embodiment of the invention.

Hash Memory Lookup

To look up a protocol connection (e.g., a TCP connection), connection data (e.g. 600) is collected from the data packets of a network connection. A connection key is generated (e.g. 610). The connection key is stored in the first element (e.g. 632 and 633) of the free list (e.g. 630). The connection key is passed through the polynomial hashing processor (e.g. 603) to generate a hash vector (to which it is also referred as hash key). The hash vector is used as a lookup key in the hash table (e.g. 650). The result of the lookup in the hash table is an offset into the hash memory that contains the value of a hash pointer.

A hash pointer value of zero (e.g., 652) means that the hash key is encountered for the first time. In this case, the lookup processor stores the new connection key by obtaining an unused stored key from the free list, copying the connection key contents into the stored key, and linking that stored key into the list associated with the hash key. A hash pointer containing a value different from zero means, that the hash key has been encountered at least once—a collision has occurred. The value of the hash key is a pointer to the top of a linked list of stored keys. The lookup processor traverses the linked list matching the value of the connection key with each of the stored keys. If one of the keys results in a match, the lookup is finished. If the linked list is completely traversed without a match, then a new stored key must be added to the linked list for this hash pointer by obtaining an unused stored key from the free list, copying the connection key contents into the stored key, and linking that stored key into the linked list that had been traversed with no match.

When a hash pointer value is zero (e.g., block 652), meaning that the hash vector has been encountered for the first time, the new key should be inserted to become to top of a linked list of stored keys. To insert a new stored key, the value in FREE_LIST register (e.g., 620) is written into the hash pointer (e.g. 652) making the first element of the free list become the top of the linked list of stored keys for the hash key. The content of the next index (e.g. 633) of the first stored key (pointing to the next free stored key e.g. 634) is copied into the FREE_LIST Register (e.g. 620) making the next stored key (e.g. 632) in the free list become the top of the free list. On the other hand, the next index of the first stored key of the linked list of the hash key is set to zero making it the last element of the linked list of stored keys for the hash key.

When a hash pointer contains a value different from zero (e.g., block 654), meaning that the hash key has been previously encountered, the hash pointer points to the top of a linked list containing stored keys. The linked list is traversed matching the connection key with each of the stored keys. If a match is found, the connection key lookup is finished. If no match if found, the new key is added to the linked list. Adding a key to the linked list is done (as previously described) by writing the address of the top element of the free list (new connection key) to the hash pointer making the new stored key the top of the linked list, or by writing the address of the top element of the free list into one of the element of the existing stored keys in the linked list. The next index pointers are also set appropriately to preserve data integrity.

In an embodiment of the invention, when a tracked networked connection is closed, the connection data is used to to compute the hash key (e.g. 603) and lookup the stored key. The hash memory storing the key is recovered by appending the memory to the free list and appropriately setting the next-index pointers in the stored key linked list where the stored key corresponding to the closed connection used to belong.

What is claimed is:

1. A testing apparatus for measuring the performance of protocol data in a data communication network comprising:
   a testing device comprising a lookup processor;
   said lookup processor configured to obtain protocol data from a data communication network;
   said protocol data comprising connection data;
   said lookup processor performing a polynomial hashing operation using said connection data as a hash key to produce a hash vector;
   said lookup processor initiating a search of hash vector values in a hash vector table to determine a location to store said hash key;
   wherein said lookup processor is configured to obtain a stored key from a free list and link said hash vector into said stored key when value of said hash vector table is zero; and
   wherein said lookup processor is configured to search for said hash vector when said value of said hash vector table is not zero.

2. The testing apparatus of claim 1 wherein said polynomial hashing operation utilizes a polynomial having an order approximately ¼ the size of the number of lookups to be performed by said lookup processor.

3. The testing apparatus of claim 1 wherein said polynomial hashing operation utilizes a polynomial of size $2^{19}$.

4. The testing apparatus of claim 1 wherein said connection data comprises source data and destination data.

5. The testing apparatus of claim 4 wherein said source data comprises a source address and source port.

6. The testing apparatus of claim 4 wherein said destination data comprises a destination address and destination port.

7. The testing apparatus of claim 1 wherein said hash vector is stored in a location associated with a matching hash vector when said search for said hash vector locates a match.

8. The testing apparatus of claim 1 wherein said hash vector table comprises a chained hash table.

9. The testing apparatus of claim 1 wherein said protocol data comprises TCP data.

10. The testing apparatus of claim 1 wherein said data communication network transports data at at least one gigabit per second.

11. A method for measuring the performance of protocol data in a data communication network comprising:
   testing the performance of protocol data, said testing comprising:
      obtaining protocol data comprising connection data from a data communication network;
      performing a polynomial hashing operation on said connection data to produce a hash vector;
      searching a hash vector table to determine a location to store said hash vector;
      obtaining a stored key from a free list and linking said hash vector into said stored key when said hash vector table is zero; and
      searching for said hash vector when said hash vector table is not zero.

12. The method of claim 11 wherein said polynomial hashing operation utilizes a polynomial having an order approximately ¼ the size of the number of lookups to be performed by said lookup processor.

13. The method of claim 11 wherein said polynomial hashing operation utilizes a polynomial of size $2^{19}$.

14. The method of claim 11 wherein said connection data comprises source data and destination data.

15. The method of claim 14 wherein said source data comprises a source address and source port.

16. The method of claim 14 wherein said destination data comprises a destination address and destination port.

17. The method of claim 11 wherein said hash vector is stored in a location associated with a matching hash vector when said search for said hash vector locates a match.

18. The method of claim 11 wherein said hash vector table comprises a chained hash table.

19. The method of claim 11 wherein said protocol data comprises TCP data.

20. The method of claim 11 wherein said data communication network transports data at at least one gigabit.

21. A computer program product comprising:
   a computer usable medium having computer readable program code for measuring the performance of protocol data in a data communication network comprising embodied therein said computer readable program code configured to:
      obtain protocol data comprising connection data from a data communication network;
      execute a polynomial hashing operation on said connection data to produce a hash vector;
      search a hash vector table to determine a location to store said hash vector;
      obtain a stored key from a free list and link said hash vector into said stored key when said hash vector table is zero; and
      search for said hash vector when said hash vector table is not zero.

22. The computer program product of claim 21 wherein said polynomial hashing operation utilizes a polynomial having an order approximately ¼ the size of the number of lookups to be performed by said computer readable program code.

23. The computer program product of claim 21 wherein said polynomial hashing operation utilizes a polynomial of size $2^{19}$.

24. The computer program product of claim 21 wherein said connection data comprises source data and destination data.

25. The computer program product of claim 24 wherein said source data comprises a source address and source port.

26. The computer program product of claim 24 wherein said destination data comprises a destination address and destination port.

27. The computer program product of claim 21 wherein said hash vector is stored in a location associated with a matching hash vector when said search for said hash vector locates a match.

28. The computer program product of claim 21 wherein said hash vector table comprises a chained hash table.

29. The computer program product of claim 21 wherein said protocol data comprises TCP data.

30. The computer program product of claim 21 wherein said data communication network transports data at at least one gigabit.

31. A system for testing the performance of TCP data in a data communication network comprising:

a data communication network configured to transport TCP data having source data and destination data;

a testing device comprising a lookup processor, said lookup processor configured to obtain said TCP data from said data communication network and execute a polynomial hashing operation using said source data and said destination data as a hash key to produce a hash vector;

said lookup processor initiating a search of a hash vector table to determine a location to store said hash vector;

said lookup processor determining if a location associated with said hash vector in said hash vector table is empty; and said lookup processor obtaining a stored key from a free list and associating said stored key with said location in said hash vector table when said location is empty.

32. The system of claim 31 wherein said lookup processor provides a result to a results FIFO.

33. The system of claim 31 further comprising:

said lookup processor searching said hash vector table for said hash vector.

34. The system of claim 31 wherein said polynomial hashing operation utilizes a polynomial having an order approximately ¼ the size of the number of lookups to be performed by said lookup processor.

35. A method for testing the performance of TCP data in a TCP/IP network comprising:

obtaining TCP data having connection data comprising source data and destination data;

providing said connection data as a hash key to a polynomial hashing operation;

executing said polynomial hashing operation to generate a hash vector;

searching a hash vector table to determine a location to store said hash vector, wherein said searching comprises:

determining if a location associated with said hash vector in said hash vector table is empty; and obtaining a stored key from a free list and associating said stored key with said location in said hash vector table when said location is empty.

36. The method of claim 35 further comprising:

searching said hash vector table for said hash vector.

37. The method of claim 35 wherein said polynomial hashing operation utilizes a polynomial having an order ¼ the size of the number of lookups to be performed.

* * * * *